US010699134B2

(12) United States Patent
He et al.

(10) Patent No.: US 10,699,134 B2
(45) Date of Patent: Jun. 30, 2020

(54) METHOD, APPARATUS, STORAGE MEDIUM AND DEVICE FOR MODELING LANE LINE IDENTIFICATION, AND METHOD, APPARATUS, STORAGE MEDIUM AND DEVICE FOR IDENTIFYING LANE LINE

(71) Applicant: Baidu Online Network Technology (Beijing) Co., Ltd., Beijing (CN)

(72) Inventors: Bei He, Beijing (CN); Zhihui Hao, Beijing (CN)

(*) Notice: Subject to any disclaimer, the term of this patent is extended or adjusted under 35 U.S.C. 154(b) by 195 days.

(21) Appl. No.: 15/750,127

(22) PCT Filed: Dec. 31, 2015

(86) PCT No.: PCT/CN2015/100175
§ 371 (c)(1),
(2) Date: Feb. 2, 2018

(87) PCT Pub. No.: WO2017/020528
PCT Pub. Date: Feb. 9, 2017

(65) Prior Publication Data
US 2018/0225527 A1    Aug. 9, 2018

(30) Foreign Application Priority Data

Aug. 3, 2015    (CN) .......................... 2015 1 0482990

(51) Int. Cl.
*G06K 9/00*   (2006.01)
*G06K 9/62*   (2006.01)
*G06N 3/04*   (2006.01)

(52) U.S. Cl.
CPC .......... *G06K 9/00798* (2013.01); *G06K 9/00* (2013.01); *G06K 9/6252* (2013.01); *G06K 9/6257* (2013.01); *G06N 3/0454* (2013.01)

(58) Field of Classification Search
None
See application file for complete search history.

(56) References Cited

U.S. PATENT DOCUMENTS 6,807,287 B1 * 10/2004 Hermans .................. G06T 7/73
382/104
8,305,445 B2 * 11/2012 Mori .................. G06K 9/00798
348/148
(Continued)

FOREIGN PATENT DOCUMENTS

CN    102201167 A    9/2011
CN    104657727 A    5/2015
(Continued)

OTHER PUBLICATIONS

Chaudhury, Kunal Narayan, Zs Püspöki, Arrate Muñoz-Barrutia, Daniel Sage, and Michael Unser. "Fast detection of cells using a continuously scalable Mexican-hat-like template." In 2010 IEEE International Symposium on Biomedical Imaging: From Nano to Macro, pp. 1277-1280. IEEE, 2010. (Year: 2010).*

(Continued)

*Primary Examiner* — Michelle M Entezari
(74) *Attorney, Agent, or Firm* — Knobbe, Martens, Olson & Bear, LLP

(57) ABSTRACT

Embodiments of the present disclosure disclose a lane line identification modeling method and apparatus, and a lane line identification method and apparatus. The lane line identification modeling method includes: identifying an image region of a lane line in an image based on two-dimensional filtering (S11); constructing model training data by using the identified image region (S12); and training a convolutional neural network-based lane line identification model by using the model training data (S13). The lane line identification modeling method and apparatus, and the lane line identification method and apparatus provided in the embodiments of the present disclosure can improve the accuracy of lane line detection.

12 Claims, 7 Drawing Sheets

(56) References Cited

U.S. PATENT DOCUMENTS

| | | | | |
|---|---|---|---|---|
| 8,855,917 | B2* | 10/2014 | Koenig | G01C 21/005 |
| | | | | 701/400 |
| 9,349,058 | B2* | 5/2016 | Schamp | G06K 9/00791 |
| 9,547,795 | B2* | 1/2017 | Gupta | G06T 7/13 |
| 9,576,214 | B1* | 2/2017 | Zhang | G06K 9/4614 |
| 9,821,813 | B2* | 11/2017 | Chandraker | G06T 17/00 |
| 10,025,997 | B2* | 7/2018 | Han | B62D 15/0285 |
| 10,062,010 | B2* | 8/2018 | Kutliroff | G06K 9/6272 |
| 2003/0128182 | A1* | 7/2003 | Donath | B60R 1/00 |
| | | | | 345/156 |
| 2005/0113995 | A1* | 5/2005 | Oyaide | G01C 11/00 |
| | | | | 701/36 |
| 2008/0273752 | A1* | 11/2008 | Zhu | B60W 40/02 |
| | | | | 382/103 |
| 2009/0169052 | A1* | 7/2009 | Seki | G06K 9/00805 |
| | | | | 382/103 |
| 2010/0100268 | A1* | 4/2010 | Zhang | B60W 30/09 |
| | | | | 701/25 |
| 2013/0085642 | A1 | 4/2013 | Dankers | |
| 2014/0086488 | A1* | 3/2014 | Moteki | G06K 9/00483 |
| | | | | 382/182 |
| 2015/0276400 | A1* | 10/2015 | Gonzalez-Banos | G06T 7/77 |
| | | | | 348/169 |

FOREIGN PATENT DOCUMENTS

| | | |
|---|---|---|
| CN | 104766058 A | 7/2015 |
| CN | 104809449 A | 7/2015 |
| CN | 105046235 A | 11/2015 |
| JP | H08202877 A | 8/1996 |
| KR | 20130076108 A | 7/2013 |

OTHER PUBLICATIONS

Aly, M., Jun. 2008, Real time detection of lane markers in urban streets. In 2008 IEEE Intelligent Vehicles Symposium(pp. 7-12). IEEE. (Year: 2008).*

Konyakhin, Igor A., Alexandr N. Timofeev, and Aleksey Konyakhin. "Three-axis optic-electronic autocollimation system for the inspection of large-scale objects." Optical Measurement Systems for Industrial Inspection VIII. vol. 8788. International Society for Optics and Photonics, 2013. (Year: 2013).*

Saedan, Mana, and Marcelo H. Ang Jr. "3D vision-based control on an industrial robot." In Proceedings of the IASTED International Conference on Robotics and Applications, pp. 152-157. 2001. (Year: 2001).*

Kim, Z., Sep. 2006, Realtime lane tracking of curved local road. In 2006 IEEE Intelligent Transportation Systems Conference (pp. 1149-1155). IEEE. (Year: 2006).*

Lienhart, Rainer, and Jochen Maydt. "An extended set of haar-like features for rapid object detection." In Proceedings. international conference on image processing, vol. 1, pp. I-I. IEEE, 2002. (Year: 2002).*

Pomerleau DA. Alvinn: An autonomous land vehicle in a neural network. InAdvances in neural information processing systems 1989 (pp. 305-313). (Year: 1989).*

Dawoud, A.K., Foda, S.G. and Tolba, A.S., Dec. 1998, A robust neural network multi-lane recognition system. In Proceedings of the Tenth International Conference on Microelectronics (Cat. No. 98EX186) (pp. 178-182). IEEE. (Year: 1998).*

International Search Report dated Apr. 28, 2016 for International Application No. PCT/CN2015/100175, 6 pages.

Written Opinion of the International Searching Authority dated Apr. 28, 2016 for International Application No. PCT/CN2015/100175, 5 pages.

Yang, Shenglan, "Design and Research of Vehicle Auxiliary Navigation System Based on Augmented Reality", Chinamaster's Theses Full-Text Database, Sep. 17, 2014, chapters 3.3.2-3.4.2, 4.2.2, 4.5.2 and 4.6.

Kim et al., "Improving Lane Detection Using Fused Deep Network Based on Conventional Neural Network and Extreme Learning Machine," School of Electronics Engineering, pp. 1803-1806, 2015.

Borkar, et al., "A Novel Lane Detection System With Efficient Ground Truth Generation", IEEE Transactions on Intelligent Transportation Systems, vol. 13, No. 1, Mar. 2012, 10 pages.

Aly, et al., "Real Time Detection of Lane Markers in Urban Streets", IEEE Intelligent Vehicles Symposium, Eindhoven, The Netherlands, Jun. 4-6, 2008, 6 pages.

Hillel, et al., "Recent Progress in ROad and Lane Detection: a survey", Machine Vision and Applications (2014) 25:727-715, 19 pages.

Kim, et al., "Robust Lane Detection Based on Convolutional Neural Network and Random Sample Consensus", School of Electronics Engineering, Kyungpook National University, Springer, International Publishing Switzerland 2014, 8 pages.

Aly et al., "Real Time Detection of Lane Markers in Urban Areas", IEEE Intelligent Vehicles Symposium, 2008, pp. 7-12.

Kim et al., "Robust Lane Detection Based on Convolution Neural Network and Random Sample Consensus", 21st International Conference ICONIP, 2014, pp. 454-461.

* cited by examiner

METHOD, APPARATUS, STORAGE MEDIUM AND DEVICE FOR MODELING LANE LINE IDENTIFICATION, AND METHOD, APPARATUS, STORAGE MEDIUM AND DEVICE FOR IDENTIFYING LANE LINE

CROSS-REFERENCE TO RELATED APPLICATION

This application is the U.S. National Phase Application under 35 U.S.C. § 371 of International Application No. PCT/CN2015/100175, filed Dec. 31, 2015, designating the U.S. and published as WO 2017/020528 A1 on Feb. 9, 2017, which claims the priority from Chinese Application No. 201510482990.1, filed on Aug. 3, 2015, entitled "Method and Apparatus for Modeling Lane Line Identification, and Method and Apparatus for Identifying Lane Line" in the name of Baidu Online Network Technology (Beijing) Co., Ltd., the entire disclosures of which are hereby incorporated by reference.

TECHNICAL FIELD

Embodiments of the present disclosure relate to the field of location-based services technology, and more particularly to a method, apparatus, storage medium and device for modeling a lane line identification, and a method, apparatus, storage medium and device for identifying a lane line.

BACKGROUND

In various location-based services (LBS) technologies, the detection of the position, type, width, color, and quantity of lane lines is of great significance to autonomous or aided driving, map navigation, and generation of basic geographic data.

An existing lane line detection method generally includes the following process: performing edge detection on an original image, binarizing the edge detection result, extracting a lane line by performing a Hough transform or a random Hough transform on the binarizing result or by using a ransac algorithm, and finally performing fine processing on the extracted lane line. Such a method has a high lane line identification accuracy for clear images when the lane line is not blocked by other objects. However, once the edge of the lane line in the image is not clear or the lane line is blocked by other objects, the detection accuracy of the existing detection method is not satisfactory.

SUMMARY

In view of the above technical problems, embodiments of the present disclosure provide a method, apparatus, storage medium and device for modeling a lane line identification, and a method, apparatus, storage medium and device for identifying a lane line to improve the accuracy of lane line detection.

According to a first aspect, an embodiment of the present disclosure provides a method for modeling a lane line identification, comprising: identifying an image region of a lane line in an image based on two-dimensional filtering; constructing model training data by using the identified image region; and training a convolutional neural network-based lane line identification model by using the model training data.

According to a second aspect, an embodiment of the present disclosure further provides an apparatus for modeling a lane line identification, comprising: an identification module, configured to identify an image region of a lane line in an image based on two-dimensional filtering; a construction module, configured to construct model training data by using the identified image region; and a training module, configured to train a convolutional neural network-based lane line identification model by using the model training data.

According to a third aspect, an embodiment of the present disclosure further provides a method for identifying a lane line, comprising: identifying an image region of a lane line in an image based on two-dimensional filtering; inputting the image, in which the image region of the lane line has been identified, into a convolutional neural network-based lane line identification model to obtain an output probability of the model; and performing model reconstruction based on the output probability to identify the lane line in the input image.

According to a fourth aspect, an embodiment of the present disclosure further provides an apparatus for identifying a lane line, comprising: an region identification module, configured to identify an image region of a lane line in an image based on two-dimensional filtering; a probability calculation module, configured to input the image, in which the image region of the lane line has been identified, into a convolutional neural network-based lane line identification model to obtain an output probability of the model; and a model reconstruction module, configured to perform model reconstruction based on the output probability to identify the lane line in the input image.

According to a fifth aspect, an embodiment of the present disclosure provides a storage medium comprising one of more computer executable instructions, the computer executable instructions when executed by a processor of a computer, causing the processor to execute a method for modeling a lane line identification, wherein the method comprises: identifying an image region of a lane line in an image based on two-dimensional filtering; constructing model training data by using the identified image region; and training a convolutional neural network-based lane line identification model by using the model training data.

According to a sixth aspect, an embodiment of the present disclosure provides a device, comprising: one or more processors; and a memory; wherein one or more programs are stored in the memory, and when executed by the one or more processors, the one or more programs cause the one or more processors to perform the following operations: identifying an image region of a lane line in an image based on two-dimensional filtering; constructing model training data by using the identified image region; and training a convolutional neural network-based lane line identification model by using the model training data.

According to a seventh aspect, an embodiment of the present disclosure provides a storage medium comprising one or more computer executable instructions, the computer executable instructions when executed by a processor of a computer, causing the processor to execute a method for identifying a lane line, wherein the method comprises: identifying an image region of a lane line in an image based on two-dimensional filtering; inputting the image, in which the image region of the lane line has been identified into a convolutional neural network-based lane line identification model to obtain an output probability of the model; and performing model reconstruction based on the output probability to identify the lane line in the input image.

According to an eighth aspect, an embodiment of the present disclosure provides a device, comprising: one or more processors; and a memory; wherein one or more programs are stored in the memory, and when executed by the one or more processors, the one or more programs cause the one or more processors to perform the following operations: identifying an image region of a lane line in an image based on two-dimensional filtering; inputting the image from which the image region of the lane line has been identified into a convolutional neural network-based lane line identification model to obtain an output probability of the model; and performing model reconstruction based on the output probability to identify the lane line in the input image.

The technical solutions provided in the embodiments of the present disclosure, by identifying an image region of a lane line in an image based on two-dimensional filtering, inputting the image from which the image region of the lane line has been identified into a convolutional neural network-based lane line identification model to obtain an output probability of the model, and performing model reconstruction based on the output probability to identify the lane line in the input image, comprehensively take into consideration various abnormal situations that may occur in the image region of the lane line in the image, thereby improving the accuracy of lane line detection.

BRIEF DESCRIPTION OF THE DRAWINGS

To describe the technical solutions in the embodiments of the present disclosure more clearly, the drawings that need to be used in the embodiments are briefly introduced. It would be obvious that the drawings in the following description are merely some embodiments of the present disclosure, and those of ordinary skill in the art may further obtain other drawings according to these drawings without creative efforts.

DETAILED DESCRIPTION OF EMBODIMENTS

The present disclosure will be further described below in detail with reference to the accompanying drawings and the embodiments. It should be appreciated that the specific embodiments described herein are merely used for explaining the present disclosure, rather than limiting the present disclosure. In addition, it should also be noted that, for the ease of description, only the parts related to the present disclosure are shown in the accompanying drawings.

First Embodiment

This embodiment provides a technical solution of a lane line identification modeling method. The lane line identification modeling method is executed by a lane line identification modeling apparatus. In addition, the lane line identification modeling apparatus may be integrated in a computing device such as a personal computer, a workstation, or a server.

Figure 1:
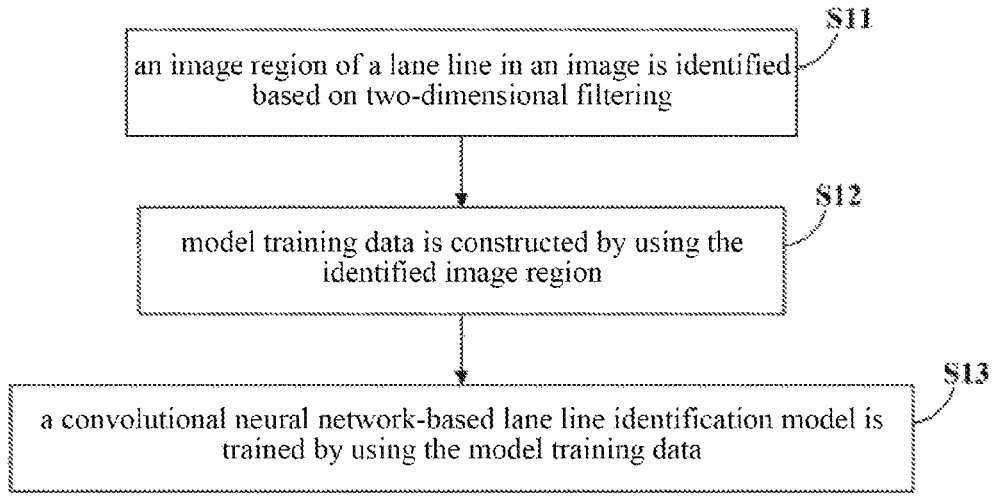
FIG. 1 is a flow chart of a lane line identification modeling method according to a first embodiment of the present disclosure.

Referring to FIG. 1, the lane line identification modeling method includes:

S11, an image region of a lane line in an image is identified based on two-dimensional filtering.

An image of a driving road is captured, and the image includes image data of a lane line. Conventional lane line identification methods have the problems of low adaptability and low identification accuracy. Specifically, once the image acquiring environment changes, for example, the lane line in the image is blocked by a large number of other objects or a large number of shadow regions appear in the image, the identification result of the lane line in the image may be a false alarm or a misjudgement.

To improve the adaptability and accuracy of lane line identification, this embodiment provides a method for training a lane line identification model, that is, a lane line identification modeling method. The lane line identification modeling method can be used to train a convolutional neural network for accurately identifying a lane line in an image. In addition, the convolutional neural network can adapt to the change in the scenario of the image, allowing a wider range of application.

Specifically, the image region of the lane line may be enhanced by performing filtering on the image. After the enhancement, the image region of the lane line is acquired. More specifically, a hat-like filter kernel for performing filtering on the image is constructed. The image region of the lane line is enhanced by using the hat-like filter kernel to perform filtering on the image, and a connected domain corresponding to the lane line is acquired according to the enhanced image region. Finally, the boundary of the connected domain is linearly fitted, thus completing the identification of the image region of the lane line.

S12, model training data is constructed by using the identified image region.

After the identification of the image region of the lane line is completed, model training data used for training a lane line identification model is constructed based on the image region of the lane line.

Specifically, the image region of the lane line may be broadened outwards, and the broadened image region is used as a region of interest. The region of interest is training data used for training the lane line identification model.

S13, a convolutional neural network-based lane line identification model is trained by using the model training data.

In the present disclosure, the lane line identification model is a convolutional neural network-based lane line identification model. The convolutional neural network includes several convolutional layers and subsampling layers. The number of convolutional layers is the same as that of subsampling layers. The convolutional neural network further includes several fully connected layers. After acquiring an image that is input into the convolutional neural network, the convolutional neural network can provide a value of a probability $\omega_i^{score}$ that the image is an image of a real lane line, that is, a value of the output probability of the lane line identification model.

This embodiment, by identifying an image region of a lane line in an image based on two-dimensional filtering, constructing model training data by using the identified image region, and training a convolutional neural network-based lane line identification model by using the model training data, comprehensively takes into consideration various abnormal situations that may occur in the image region of the lane line in the image, thereby improving the accuracy of lane line detection.

Second Embodiment

Based on the foregoing embodiment of the present disclosure, this embodiment further provides a technical solution of a lane line identification modeling method. In this technical solution, before the identifying an image region of a lane line in a background image based on two-dimensional filtering, the method further includes: performing an inverse projection transformation on the original image to adjust the optical axis direction of the original image to be perpendicular to a ground surface.

Figure 2:
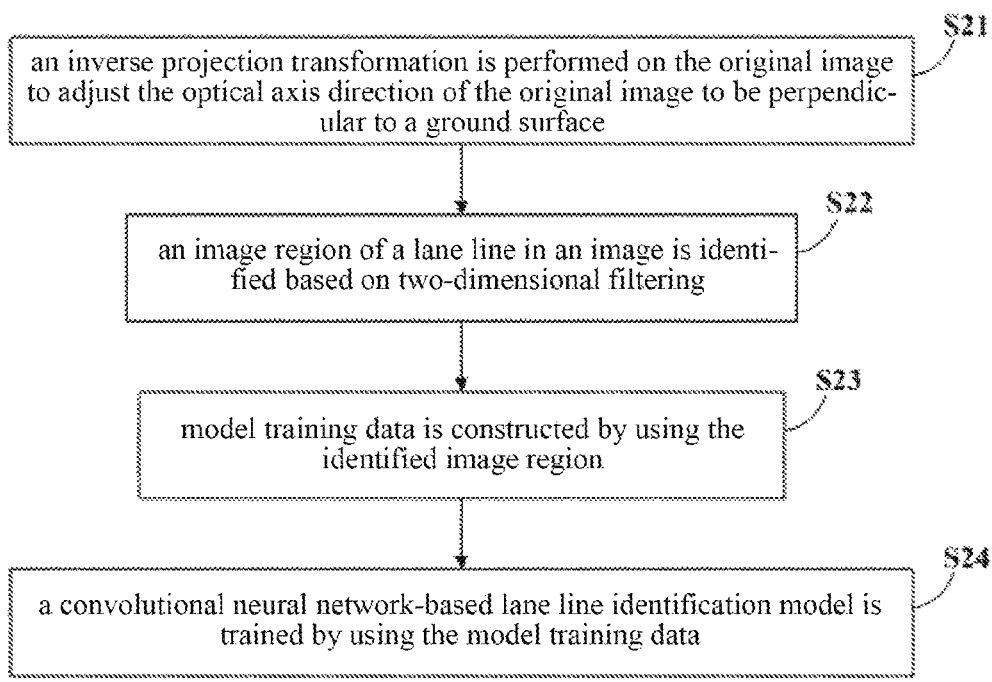
FIG. 2 is a flow chart of a lane line identification modeling method according to a second embodiment of the present disclosure.

Referring to FIG. 2, the lane line identification modeling method includes:

S21, an inverse projection transformation is performed on the original image to adjust the optical axis direction of the original image to be perpendicular to a ground surface.

It should be appreciated that generally when a road surface image of a road is captured, the optical axis of a camera used for image capturing is substantially parallel to the road surface. To make lane line images that are input into the convolutional neural network have more uniform features, and thus improve the accuracy of lane line detection, an inverse projection transformation needs to be performed on images which are captured when the optical axis is not perpendicular to the road surface.

The inverse projection transformation may also be referred to as inverse perspective mapping, and is used for mapping a pixel point in a two-dimensional image acquired by the camera into a three-dimensional space. More specifically, assuming that the pitch angle, the yaw angle and the roll angle of the camera when the image is captured are respectively $\alpha$, $\beta$ and $\gamma$, the focal lengths of the camera in the vertical and horizontal directions are respectively $f_u$ and $f_v$, the abscissa and the ordinate of the coordinate point at the optical center of the camera are respectively $c_u$ and $c_v$, and the normalized parameter is s, the inverse projection transformation is performed according to equation (1):

$$\begin{pmatrix} \frac{x_w}{z_w} \\ \frac{y_w}{z_w} \\ \frac{z_w}{z_w} \\ 1 \end{pmatrix} = s \begin{pmatrix} \cos\gamma & 0 & \sin\gamma \\ 0 & 1 & 0 \\ -\sin\gamma & 0 & \cos\gamma \end{pmatrix} \begin{pmatrix} \cos\beta & \sin\beta & 0 \\ -\sin\beta & \cos\beta & 0 \\ 0 & 0 & 1 \end{pmatrix} \quad (1)$$

$$\begin{pmatrix} 1 & 0 & 0 \\ 0 & \cos\alpha & \sin\alpha \\ 0 & -\sin\alpha & \cos\alpha \end{pmatrix} \begin{pmatrix} 1/f_u & 0 & -c_u/f_u \\ 0 & 1/f_v & -c_v/f_v \\ 0 & 0 & 1 \end{pmatrix} \begin{pmatrix} u \\ v \\ 1 \end{pmatrix}$$

where, (u, v) are position coordinates of a pixel point in the two-dimensional image, and $(x_w, y_w, z_w)$ are position coordinates of the pixel point in the three-dimensional space after transformation.

S22, an image region of a lane line in an image is identified based on two-dimensional filtering.

S23, model training data is constructed by using the identified image region.

S24, a convolutional neural network-based lane line identification model is trained by using the model training data.

In this embodiment, before an image region of a lane line in an image is identified based on two-dimensional filtering, an inverse projection transformation is performed on the original image to adjust the optical axis direction of the original image to be perpendicular to a ground surface, so that the optical axis direction of the image to be input into the convolutional neural network is made uniform before the image is input into the convolutional neural network, thereby improving the accuracy of detection of the lane line in the image.

Third Embodiment

Based on the foregoing embodiment of the present disclosure, this embodiment further provides a technical solution of the identification step in the lane line identification modeling method. In this technical solution, the identifying an image region of a lane line in an image based on two-dimensional filtering includes: performing filtering on the background image by using hat-like filter kernels having different width parameters and height parameters, and selecting an image having the most distinguished image contour as a filtering result image; binarizing the filtering result image to form at least one connected domain; and performing linear boundary fitting on the connected domain by using an improved ransac algorithm.

Figure 3:
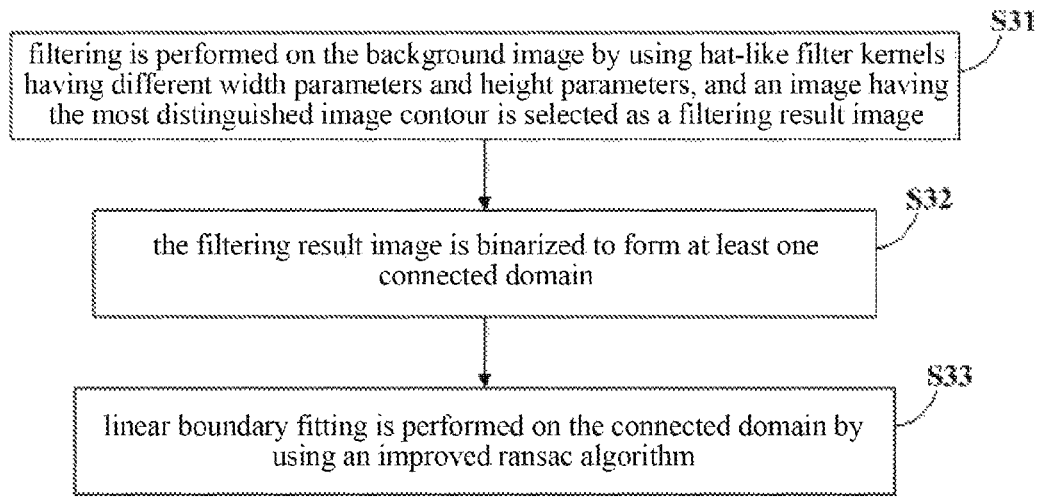
FIG. 3 is a flow chart of an identification step in a lane line identification modeling method according to a third embodiment of the present disclosure.

Referring to FIG. 3, the identifying an image region of a lane line in an image based on two-dimensional filtering includes:

S31, filtering is performed on the background image by using hat-like filter kernels having different width parameters and height parameters, and an image having the most distinguished image contour is selected as a filtering result image.

The filtering operation performed by the hat-like filter kernels are expressed as the following equation:

$$I(x, y) = 2 \sum_{u=x-\frac{w}{2}}^{x+\frac{w}{2}} \sum_{v=y-\frac{h}{2}}^{y+\frac{h}{2}} I(u, v) - \sum_{u=x-\frac{3}{2}w}^{x-\frac{w}{2}} \sum_{v=y-\frac{h}{2}}^{y+\frac{h}{2}} I(u, v) - \sum_{u=x+w/2}^{x+\frac{3}{2}w} \sum_{v=y-h/2}^{y+h/2} I(u, v) \qquad (2)$$

where, I(x,y) is a grayscale value of the pixel point after filtering, I(u,v) is a grayscale value of the pixel point before filtering, w is a width parameter in the filtering process, and h is a height parameter in the filtering process. Ideally, the parameter w is equal to the width of the lane line, and the parameter h is equal to the height of the lane line.

As the photographing parameters of the camera and the dimension of the lane line vary, hat-like filter kernels having different width parameters and height parameters should be used for different lane lines. Therefore, in this embodiment, a set of hat-like filter kernels having different width parameters and height parameters are used to separately perform filtering on the image, and then the image with the most significant image enhancement effect is selected from the filtering results as a filtering result image.

S32, the filtering result image is binarized to form at least one connected domain.

After the image enhancement processing by the hat-like filter kernels, the region in the filtering result image corresponding to the lane line is more obviously different from other regions in the image. In this case, if the filtering result image is binarized, the binarizing result is more credible.

The operation of binarizing the filtering result image is specifically: using pixels whose grayscale values are higher than a preset grayscale threshold as pixels inside the connected domain, and using pixels whose grayscale values are lower than the preset grayscale threshold as pixels outside the connected domain. By means of the above-mentioned operation, at least one connected domain is formed inside the filtering result image. Generally, the connected domain identifies an approximate region where the lane line is located in the image.

S33, linear boundary fitting is performed on the connected domain by using an improved ransac algorithm.

After the filtering and binarization, several connected domains are formed inside the lane line identification model. Because illumination may be uneven in the image or the lane line may be blocked by other objects, the actual boundary of the connected domain acquired may not be a straight line. Therefore, this embodiment the boundary of the connected domain is linearly fitted by using an improved ransac algorithm.

The random sample consensus (Ransac) algorithm is an algorithm for calculating parameters of a mathematical model from a set of sample data that contains outliers to obtain useful sample data. When linear fitting is performed by using an existing ransac algorithm, the response strength of sample points used for fitting a straight line is not considered. In other words, in the existing ransac algorithm, all the sample points are of equal importance. Compared with the conventional ransac algorithm, in the ransac algorithm provided in this embodiment, each sample point is weighted by using its response strength as a weighting parameter, and then a straight line is fitted according to the weighted values.

Specifically, several sample points may be selected at the boundary of the connected domain, and grayscale values of the sample points are used as their respective weighting parameters to calculate the number of inliers for the current model. In this way, through multiple iterative computations, a straight line fitted according to the improved ransac algorithm provided in this embodiment can be obtained.

This embodiment, by performing filtering on the background image by using hat-like filter kernels having different width parameters and height parameters and selecting an image having the most distinguished image contour as a filtering result image, binarizing the filtering result image to form at least one connected domain, and performing linear boundary fitting on the connected domain by using an improved ransac algorithm, implements the accurate identification of the image region of the lane line.

Fourth Embodiment

Based on the foregoing embodiment of the present disclosure, this embodiment further provides a flow chart of the construction step in the lane line identification modeling method. In this technical solution, the constructing model training data by using the identified image region includes: broadening the connected domain to form a region of interest on the image; and using the image including the region of interest as the model training data.

Figure 4:
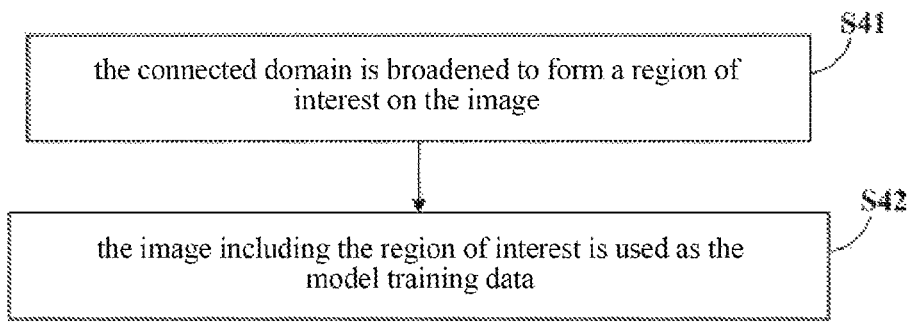
FIG. 4 is a flow chart of a construction step in a lane line identification modeling method according to a fourth embodiment of the present disclosure.

Referring to FIG. 4, the constructing model training data by using the identified image region includes:

S41, the connected domain is broadened to form a region of interest on the image.

The boundary of the connected domain for which boundary fitting has been performed is broadened. Specifically, the connected domain may be broadened by a predetermined number of pixel points in the width direction, and then broadened by a predetermined number of pixel points in the height direction. In this way, a region of interest is formed after broadening.

S42, the image including the region of interest is used as the model training data.

Figure 5:
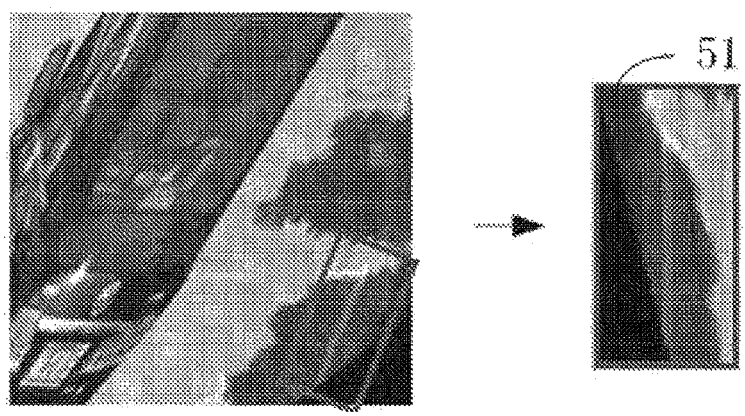
FIG. 5 is a schematic diagram of a region of interest according to a fourth embodiment of the present disclosure.

FIG. 5 shows an example of the region of interest. Referring to FIG. 5, in this example, the region denoted by the solid-line box 51 is the region of interest.

The purpose of broadening the connected domain corresponding to the lane line and using the region of interest obtained after broadening as training data for training the model is to obtain training data that not only includes a target image to be identified, but also includes some background-image information, and use such background-image information as contexts of the lane line, thereby improving the identification accuracy of the lane line identification model obtained through training.

This embodiment, by broadening the connected domain to form a region of interest on the image, and using the image including the region of interest as the model training data, implements the construction of the model training data, so that a lane line identification model can be created according to the constructed training data.

Fifth Embodiment

This embodiment provides a technical solution of a lane line identification method. The difference between the lane line identification modeling method provided in the foregoing embodiment of the present disclosure and this embodiment lies in that the lane line identification modeling method is used for creating a lane line identification model, while the lane line identification method provided in this embodiment uses the lane line identification model created in the foregoing embodiment to identify a lane line in an image.

Figure 6:
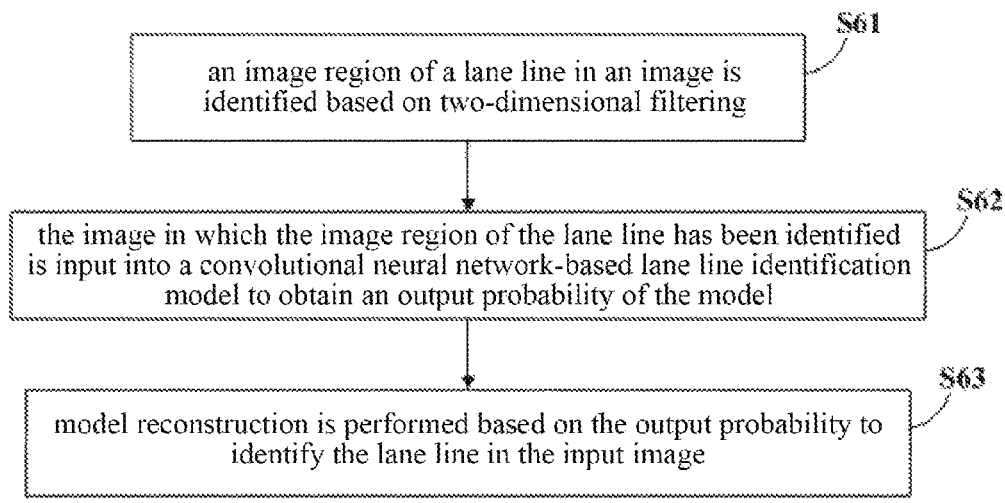
FIG. 6 is a flow chart of a lane line identification method according to a fifth embodiment of the present disclosure.

Referring to FIG. 6, the lane line identification method includes:

S61, an image region of a lane line in an image is identified based on two-dimensional filtering.

In this embodiment, the image region of the lane line is identified in the image in the same manner as that described in the third embodiment of the present disclosure. That is, filtering is performed on the image by using hat-like filter kernels, the image is binarized after the filtering, and finally the boundary of the connected domain obtained after the binarization is linearly fitted by using an improved ransac algorithm, thus implementing the identification of the image region of the lane line.

S62, the image from which the image region of the lane line has been identified is input into a convolutional neural network-based lane line identification model to obtain an output probability of the model.

The image from which the image region of the lane line has been identified is input into the convolutional neural network. After acquiring the input image, the convolutional neural network performs calculation for the image, and outputs a probability $w_i^{score}$ that each identified image region of the lane line in the image is an image region of a real lane line.

S63, model reconstruction is performed based on the output probability to identify the lane line in the input image.

In this embodiment, model reconstruction is performed using a depth search technique, so as to identify the lane line in the input image. Specifically, possible lane lines are divided into k groups, a length weight of each lane line as well as an angle difference weight and a distance difference weight between lane lines in each group of lane lines are calculated. The length weight $w_i^{length}$ of the lane line is expressed as equation (3):

$$w_i^{length} = \min(1, l_i \times 2 \div H) \quad (3)$$

where, H and $l_i$ respectively represent the height and width of the lane line.

An angle difference weight $w_i^{angle}$ between the $i^{th}$ lane line and the $j^{th}$ lane line is expressed as equation (4):

$$w_i^{angle} = \exp\{\|\theta_i \theta_j\|^2 / \sigma_{angle}^2\} \quad (4)$$

where, $\theta_i$ represents an angle of the $i^{th}$ lane line, $\theta_j$ represents an angle of the $j^{th}$ lane line, and $\sigma_{angle}$ represents an angle difference threshold.

A distance difference weight $w_i^{dist}$ between the $i^{th}$ lane line and the $j^{th}$ lane line is expressed as equation (5):

$$w_i^{dist} = \begin{cases} 1, & \|l_i - l_j\| \leq l_{max} \text{ and } \|l_i - l_j\| \geq l_{min} \\ 0, & \text{else} \end{cases} \quad (5)$$

where, $l_{max}$ represents a maximum distance threshold, and $l_{min}$ represents a minimum distance threshold.

Then, the above-mentioned three parameters, together with the output probability of the model, that is, the probability that a lane line is a real lane line, jointly constitute a target function of model reconstruction:

$$\arg\max_k \Sigma_{i \in L_k} \|w_i^{length} + w_i^{score} + (\Sigma_{j \in L_k \& j \neq i} w_{ij}^{angle} + w_{ij}^{dist})\| \quad (6)$$

A set of lane lines that causes the target function expressed as equation (6) to have the greatest value may be considered to be real lane lines.

Figure 7A:
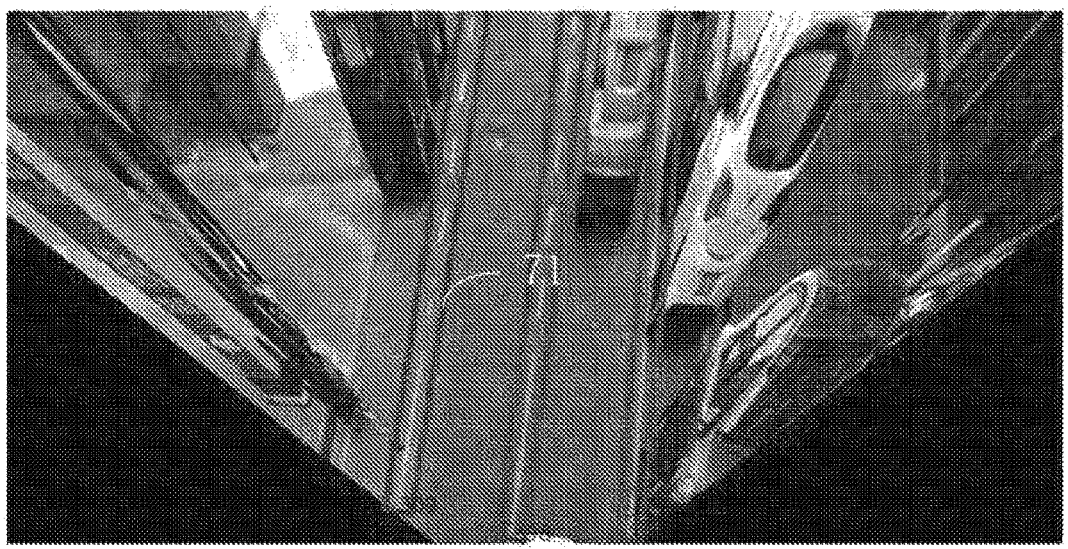
FIG. 7A is a diagram illustrating an identification result of lane line identification in a scenario with a large number of obstructions according to the fifth embodiment of the present disclosure.
Figure 7B:
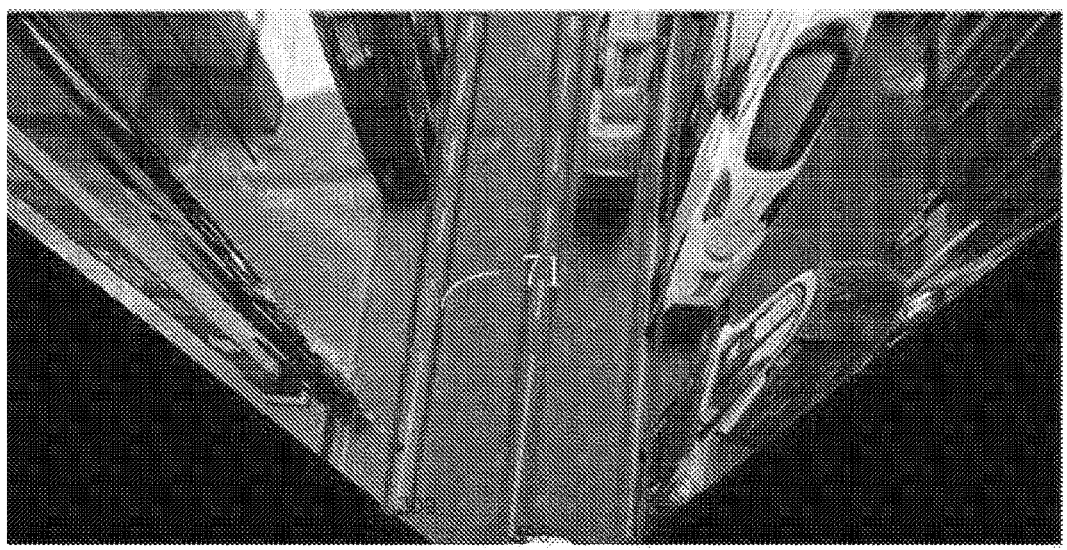
FIG. 7B is a diagram illustrating an identification result of lane line identification in a shadow scenario according to the fifth embodiment of the present disclosure.
Figure 7C:
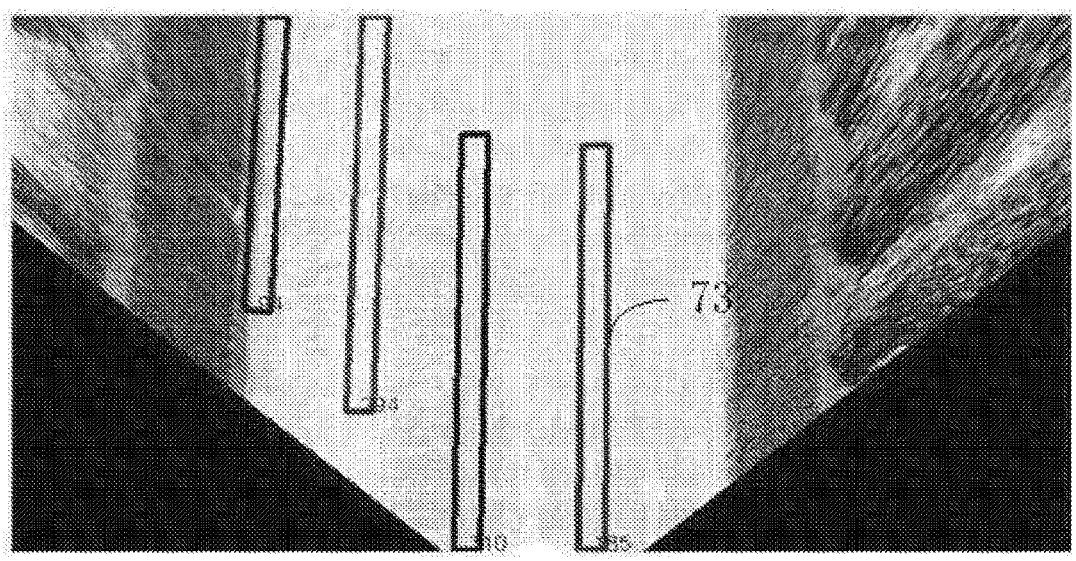
FIG. 7C is a diagram illustrating an identification result of lane line identification in a scenario with varying light conditions according to the fifth embodiment of the present disclosure.
Figure 7D:
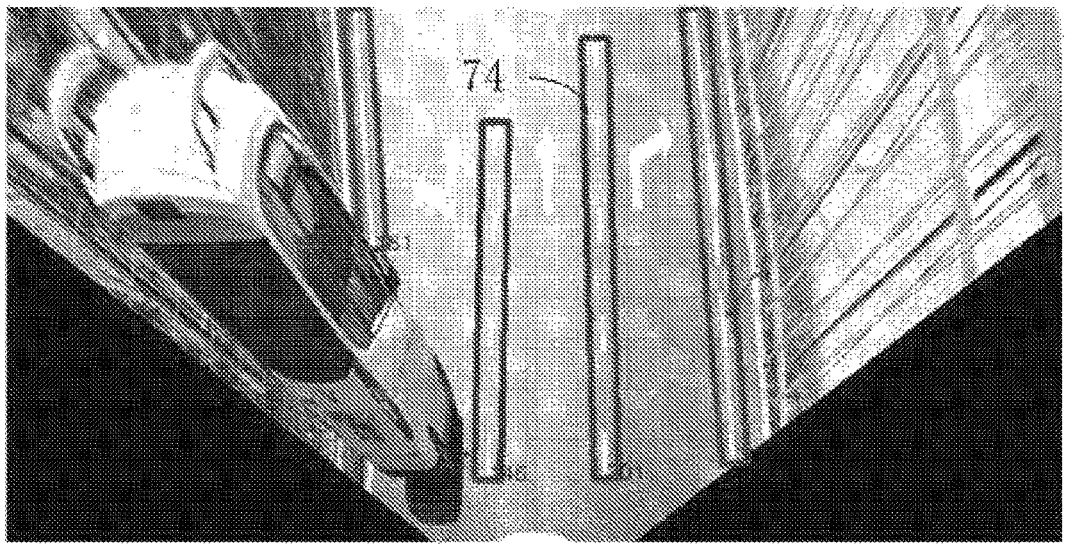
FIG. 7D is a diagram illustrating an identification result of lane line identification in a scenario with interfering ground marks according to the fifth embodiment of the present disclosure.

The above-mentioned lane line identification method can adapt to the change in the photographing scenario of the sample image. FIG. 7 show sample images captured in several particular scenarios. FIG. 7A shows a sample image captured in a scenario with a large number of obstructions. FIG. 7B shows a sample image captured in a shadow scenario. FIG. 7C shows a sample image captured in a scenario with varying light conditions. FIG. 7D shows a sample image captured in a scenario with interfering ground marks. When lane line identification is performed in the sample images by using the lane line identification method provided in this embodiment, lane lines in the sample images can be accurately identified. In FIG. 7A to FIG. 7D, regions denoted by solid-line boxes 71, 72, 73, and 74 are identified lane lines.

This embodiment, by identifying an image region of a lane line in an image based on two-dimensional filtering, inputting the image from which the image region of the lane line has been identified into a convolutional neural network-based lane line identification model to obtain an output probability of the model, and performing model reconstruction based on the output probability to identify the lane line in the input image, can adapt to various changes in the input image, thereby improving the accuracy of lane line identification.

Sixth Embodiment

Based on the fifth embodiment of the present disclosure, this embodiment further provides a technical solution of a lane line identification method. In this technical solution, before the identifying an image region of a lane line in an image based on two-dimensional filtering, the method further includes: performing an inverse projection transformation on the original image to adjust the optical axis direction of the original image to be perpendicular to a ground surface.

Figure 8:
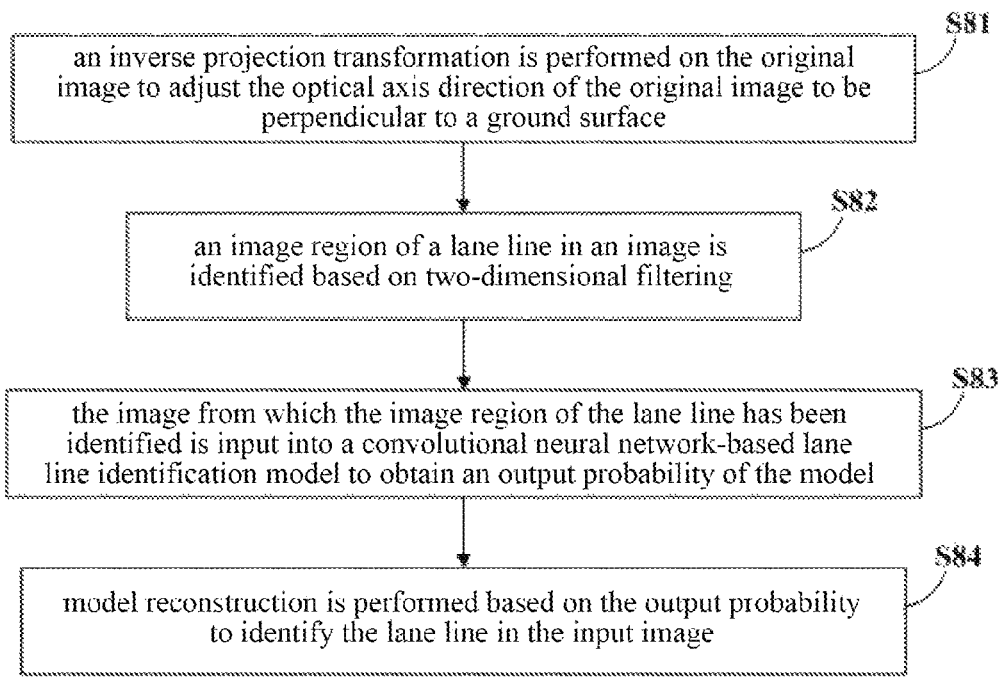
FIG. 8 is a flow chart of a lane line identification method according to a sixth embodiment of the present disclosure.

Referring to FIG. 8, the lane line identification method includes:

S81, an inverse projection transformation is performed on the original image to adjust the optical axis direction of the original image to be perpendicular to a ground surface.

Similar to the model training process, some of sample images for which lane line identification needs to be performed may be captured when the optical axis is not perpendicular to the ground surface. In this case, an inverse projection transformation also needs to be performed on the original image. A specific inverse projection transformation process can be referred to the description in the second embodiment of the present disclosure.

S82, an image region of a lane line in an image is identified based on two-dimensional filtering.

S83, the image from which the image region of the lane line has been identified is input into a convolutional neural network-based lane line identification model to obtain an output probability of the model.

S84, model reconstruction is performed based on the output probability to identify the lane line in the input image.

In this embodiment, before an image region of a lane line in an image is identified based on two-dimensional filtering, an inverse projection transformation is performed on the original image to adjust the optical axis direction of the original image to be perpendicular to a ground surface, so that the optical axis direction of the image for which lane line identification needs to be performed is made uniform before the image is input into the convolutional neural network, thereby improving the accuracy of detection of the lane line in the image.

Seventh Embodiment

Figure 9:
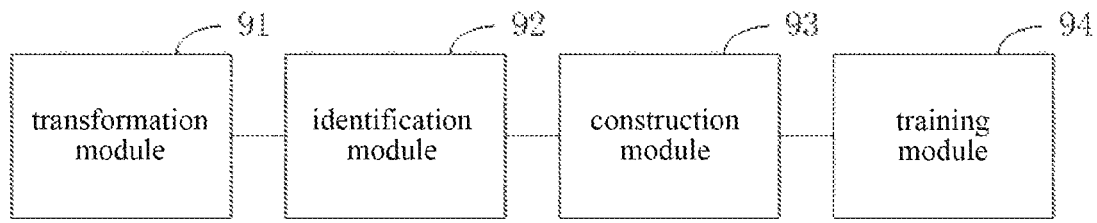
FIG. 9 is a structural diagram of a lane line identification modeling apparatus according to a seventh embodiment of the present disclosure.

This embodiment provides a technical solution of a lane line identification modeling apparatus. Referring to FIG. 9, the lane line identification modeling apparatus includes: an identification module 92, a construction module 93, and a training module 94.

The identification module 92 is configured to identify an image region of a lane line in an image based on two-dimensional filtering.

The construction module 93 is configured to construct model training data by using the identified image region.

The training module 94 is configured to train a convolutional neural network-based lane line identification model by using the model training data.

Further, the lane line identification modeling apparatus further includes a transformation module 91.

The transformation module 91 is configured to perform an inverse projection transformation on the original image to adjust the optical axis direction of the original image to be perpendicular to a ground surface, before the image region of the lane line in the background image is identified based on two-dimensional filtering.

Further, the transformation module 91 is specifically configured to: perform an inverse projection transformation on the original image according to the following equation:

$$\begin{bmatrix} \frac{x_w}{z_w} \\ \frac{y_w}{z_w} \\ 1 \end{bmatrix} = s \begin{bmatrix} \cos\gamma & 0 & \sin\gamma \\ 0 & 1 & 0 \\ -\sin\gamma & 0 & \cos\gamma \end{bmatrix} \begin{bmatrix} \cos\beta & \sin\beta & 0 \\ -\sin\beta & \cos\beta & 0 \\ 0 & 0 & 1 \end{bmatrix}$$

$$\begin{bmatrix} 1 & 0 & 0 \\ 0 & \cos\alpha & \sin\alpha \\ 0 & -\sin\alpha & \cos\alpha \end{bmatrix} \begin{bmatrix} 1/f_u & 0 & -c_u/f_u \\ 0 & 1/f_v & -c_v/f_v \\ 0 & 0 & 1 \end{bmatrix} \begin{bmatrix} u \\ v \\ 1 \end{bmatrix}$$

where, α, β, and γ are respectively a pitch angle, a yaw angle and a roll angle of a camera, $f_u$ and $f_v$ are focal lengths of the camera in vertical and horizontal directions, $c_u$ and $c_v$ are an abscissa and an ordinate of a coordinate point at the optical center of the camera, u and v respectively represent an abscissa and an ordinate of a coordinate point in a two-dimensional space of the image before transformation, $x_w$, $y_w$ and $z_w$ respectively represent three-dimensional coordinates of the coordinate point in the three-dimensional space, and s is a normalized parameter.

Further, the identification module 92 includes: a filter unit, a binarization unit, and a fitting unit.

The filter unit is configured to perform filtering on the background image by using hat-like filter kernels having different width parameters and height parameters, and select an image having the most distinguished image contour as a filtering result image.

The binarization unit is configured to binarize the filtering result image to form at least one connected domain.

The fitting unit is configured to perform linear boundary fitting on the connected domain by using an improved ransac algorithm.

Further, the construction module 93 includes: a broadening unit and a data acquiring unit.

The broadening unit is configured to broaden the connected domain to form a region of interest on the image.

The data acquiring unit is configured to use the image including the region of interest as the model training data.

Eighth Embodiment

Figure 10:
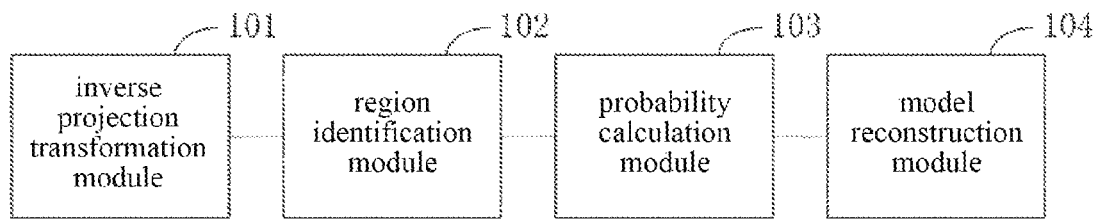
FIG. 10 is a structural diagram of a lane line identification apparatus according to an eighth embodiment of the present disclosure.

This embodiment provides a technical solution of a lane line identification apparatus. Referring to FIG. 10, the lane line identification apparatus includes: a region identification module 102, a probability calculation module 103, and a model reconstruction module 104.

The region identification module 102 is configured to identify an image region of a lane line in an image based on two-dimensional filtering.

The probability calculation module 103 is configured to input the image from which the image region of the lane line has been identified into a convolutional neural network-based lane line identification model to obtain an output probability of the model.

The model reconstruction module 104 is configured to perform model reconstruction based on the output probability to identify the lane line in the input image.

Further, the lane line identification apparatus further includes an inverse projection transformation module 101.

The inverse projection transformation module 101 is configured to perform an inverse projection transformation on the original image to adjust the optical axis direction of the original image to be perpendicular to a ground surface, before the image region of the lane line in the image is identified based on two-dimensional filtering.

Further, the model reconstruction module 104 is specifically configured to:

perform model reconstruction according to the following equation:

$$\operatorname*{argmax}_{k} \sum_{i \in L_k} \left\| w_i^{length} + w_i^{score} + \left( \sum_{j \in L_k \& j \neq i} w_{ij}^{angle} + w_{ij}^{dist} \right) \right\|$$

where $w_i^{length}$ and $w_i^{score}$ respectively represent the length of the $i^{th}$ lane line and the probability that the $i^{th}$ lane line is a real lane line, and $w_{ij}^{angle}$, $w_{ij}^{dist}$ respectively represent constraint relationships of angle similarity and distance between the $i^{th}$ lane line and the $j^{th}$ lane line.

Ninth Embodiment

An embodiment of the present disclosure provides a storage medium comprising computer executable instructions, the computer executable instructions when executed by a processor of a computer, causing the processor to execute a lane line identification modeling method, where the method includes:

identifying an image region of a lane line in an image based on two-dimensional filtering;

constructing model training data by using the identified image region; and training a convolutional neural network-based lane line identification model by using the model training data.

When the storage medium executes the method, before the identifying an image region of a lane line in a background image based on two-dimensional filtering, the method further includes:

performing an inverse projection transformation on the original image to adjust the optical axis direction of the original image to be perpendicular to a ground surface.

When the storage medium executes the method, the performing an inverse projection transformation on the original image to adjust the optical axis direction of the original image to be perpendicular to a ground surface includes:

performing an inverse projection transformation on the original image according to the following equation:

$$\begin{bmatrix} \frac{x_w}{z_w} \\ \frac{y_w}{z_w} \\ 1 \end{bmatrix} = s \begin{bmatrix} \cos\gamma & 0 & \sin\gamma \\ 0 & 1 & 0 \\ -\sin\gamma & 0 & \cos\gamma \end{bmatrix} \begin{bmatrix} \cos\beta & \sin\beta & 0 \\ -\sin\beta & \cos\beta & 0 \\ 0 & 0 & 1 \end{bmatrix}$$

$$\begin{bmatrix} 1 & 0 & 0 \\ 0 & \cos\alpha & \sin\alpha \\ 0 & -\sin\alpha & \cos\alpha \end{bmatrix} \begin{bmatrix} 1/f_u & 0 & -c_u/f_u \\ 0 & 1/f_v & -c_v/f_v \\ 0 & 0 & 1 \end{bmatrix} \begin{bmatrix} u \\ v \\ 1 \end{bmatrix}$$

where, $\alpha$, $\beta$, and $\gamma$ are respectively a pitch angle, a yaw angle and a roll angle of a camera, $f_u$ and $f_v$ are focal lengths of the camera in vertical and horizontal directions, $c_u$ and $c_v$ are an abscissa and an ordinate of a coordinate point at the optical center of the camera, u and v respectively represent an abscissa and an ordinate of a coordinate point in a two-dimensional space of the image before transformation, $x_w$, $y_w$ and $z_w$ respectively represent three-dimensional coordinates of the coordinate point in the three-dimensional space, and s is a normalized parameter.

When the storage medium executes the method, the identifying an image region of a lane line in an image based on two-dimensional filtering includes:

performing filtering on the background image by using hat-like filter kernels having different width parameters and height parameters, and selecting an image having the most distinguished image contour as a filtering result image;

binarizing the filtering result image to form at least one connected domain; and performing linear boundary fitting on the connected domain by using an improved ransac algorithm.

When the storage medium executes the method, the constructing model training data by using the identified image region includes:

broadening the connected domain to form a region of interest on the image; and using the image including the region of interest as the model training data.

Tenth Embodiment

Figure 11:
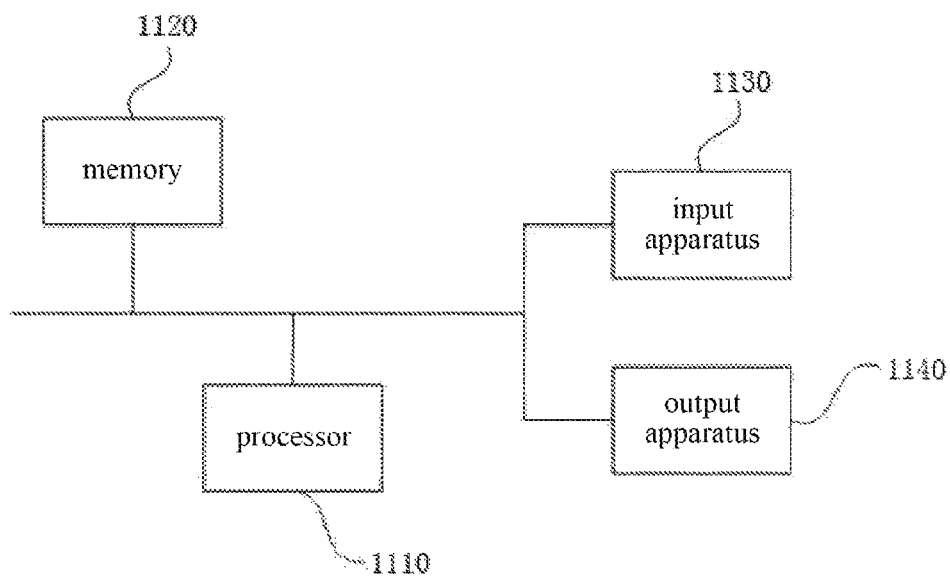
FIG. 11 is a schematic structural diagram of hardware of a device configured to execute a lane line identification modeling method according to a tenth embodiment of the present disclosure.

FIG. 11 is a schematic structural diagram of hardware of a device configured to execute a method for modeling a lane line identification according to a tenth embodiment of the present disclosure. Referring to FIG. 11, the device includes one or more processors 1110 (for example, one processor 1110 as shown in FIG. 11), a memory 1120 and one or more modules.

The device may further include an input apparatus 1130 and an output apparatus 1140. The processor 1110, memory 1120, input apparatus 1130 and output apparatus 1140 may be connected via a bus or another approach. For example, FIG. 11 shows the connection via the bus.

The memory 1120 as a computer readable storage medium can store a software program, a computer executable program and a module, such as the program instructions/modules corresponding to the method for modeling a lane line identification of the present disclosure (e.g. the transformation module 91, the identification module 92, the construction module 93, and the training module 94 in the apparatus for modeling a lane line identification as shown in FIG. 9). The processor 1110 executes various functions of the device and processes data by running the software program, computer executable program and module stored in the memory 1120, so as to implement the method for modeling a lane line identification of the above embodiment.

The memory 1120 may include a program storing region and a data storing region. The program storing region may store an operating system and an application required for at least one function. The data storing region may store data established for terminals' use, and the like. Moreover, the memory 1120 may include a high speed random access memory, and may include a non-volatile memory, such as at least one disk storage device, flash memory device, and other non-volatile solid memory device. In some embodiments, the memory 1120 may further include a memory disposed apart from the processor 1110, which may be connected to a terminal device via a network. The network includes by not limited to the Internet, intranet, LAN, mobile communication network, and the combination thereof.

The input apparatus 1130 may be configured to receive an input number or character message and generate a key signal input related to the terminal user settings and the function control. The output apparatus 1140 may include a display device, such as a display screen.

The one or more modules are stored in the memory 1120, and when executed by the one or more processors 1110, cause the one or more processors 1110 to perform operations. The operations include: identifying an image region of a lane line in an image based on two-dimensional filtering; constructing model training data by using the identified image region; and training a convolutional neural network-based lane line identification model by using the model training data.

Further, before the identifying an image region of a lane line in a background image based on two-dimensional filtering, the method further comprises: performing an inverse projection transformation on an original image to adjust an optical axis direction of the original image to be perpendicular to a ground surface.

Further, the performing an inverse projection transformation on an original image to adjust an optical axis direction of the original image to be perpendicular to a ground surface comprises performing the inverse projection transformation on the original image according to an equation below:

$$\begin{bmatrix} \frac{x_w}{z_w} \\ \frac{y_w}{z_w} \\ 1 \end{bmatrix} = s \begin{bmatrix} \cos\gamma & 0 & \sin\gamma \\ 0 & 1 & 0 \\ -\sin\gamma & 0 & \cos\gamma \end{bmatrix} \begin{bmatrix} \cos\beta & \sin\beta & 0 \\ -\sin\beta & \cos\beta & 0 \\ 0 & 0 & 1 \end{bmatrix}$$

$$\begin{bmatrix} 1 & 0 & 0 \\ 0 & \cos\alpha & \sin\alpha \\ 0 & -\sin\alpha & \cos\alpha \end{bmatrix} \begin{bmatrix} 1/f_u & 0 & -c_u/f_u \\ 0 & 1/f_v & -c_v/f_v \\ 0 & 0 & 1 \end{bmatrix} \begin{bmatrix} u \\ v \\ 1 \end{bmatrix}$$

wherein $\alpha$, $\beta$, and $\gamma$ are respectively a pitch angle, a yaw angle and a roll angle of a camera, $f_u$ and $f_v$ are respectively focal lengths of the camera in vertical and horizontal directions, $c_u$ and $c_v$ are respectively an abscissa and an ordinate of a coordinate point at an optical center of the camera, u and v respectively represent an abscissa and an ordinate of a coordinate point in a two-dimensional space of an image before transformation, $x_w$, $y_w$ and $z_w$ respectively represent three-dimensional coordinates of the coordinate point in a three-dimensional space after transformation, and s is a normalized parameter.

Further, the identifying an image region of a lane line in an image based on two-dimensional filtering comprises: performing filtering on the background image by using hat-like filter kernels having different width parameters and height parameters, and selecting an image having a most distinguished image contour as a filtering result image; binarizing the filtering result image to form a connected domain; and performing linear boundary fitting on the connected domain by using an improved ransac algorithm.

Further, the constructing model training data by using the identified image region comprises: broadening the connected domain to form a region of interest on the image; and using the image comprising the region of interest as the model training data.

Eleventh Embodiment

The embodiment provides a storage medium comprising computer executable instructions. The computer executable instructions when executed by a processor of a computer, cause the processor to execute a method for identifying a lane line. The method comprises: identifying an image region of a lane line in an image based on two-dimensional filtering; inputting the image, in which the image region of the lane line has been identified, into a convolutional neural network-based lane line identification model to obtain an output probability of the model; and performing model reconstruction based on the output probability to identify the lane line in the input image.

The storage medium executes the method further comprising performing an inverse projection transformation on an original image to adjust an optical axis direction of the original image to be perpendicular to a ground surface, before the identifying an image region of a lane line in an image based on two-dimensional filtering.

When the storage medium executes the method, the performing model reconstruction based on the output probability to identify the lane line in the input image comprises:

performing model reconstruction according to an equation below:

$$\operatorname*{argmax}_{k} \sum_{i \in L_k} \left\| w_i^{length} + w_i^{score} + \left( \sum_{j \in L_k \& j \neq i} w_{ij}^{angle} + w_{ij}^{dist} \right) \right\|$$

wherein $w_i^{length}$ and $w_i^{score}$ respectively represent a length of an $i^{th}$ lane line and a probability that the $i^{th}$ lane line is a real lane line, and $w_{ij}^{angle}$, $w_{ij}^{dist}$ respectively represent constraint relationships of angle similarity and distance between the $i^{th}$ lane line and a $j^{th}$ lane line.

Twelfth Embodiment

Figure 12:
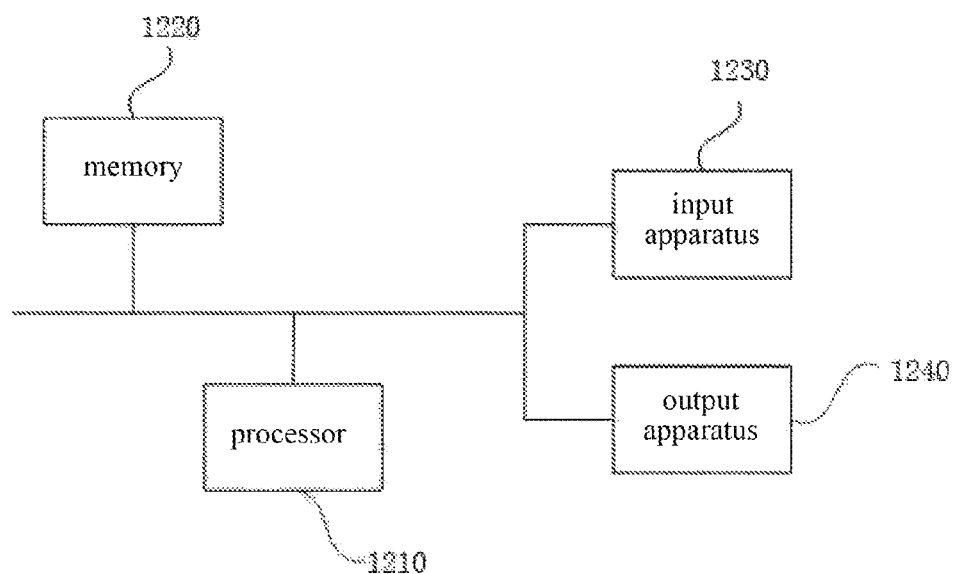
FIG. 12 is a schematic structural diagram of hardware of a device configured to execute a lane line identification method according to a twelfth embodiment of the present disclosure.

FIG. 12 is a schematic structural diagram of hardware of a device configured to execute a method for identifying a lane line according to a twelfth embodiment of the present disclosure. Referring to FIG. 12, the device includes one or more processors 1210 (for example, one processor 1210 as shown in FIG. 12), a memory 1220 and one or more modules.

The device may further include an input apparatus 1230 and an output apparatus 1240. The processor 1210, memory 1220, input apparatus 1230 and output apparatus 1240 may be connected via a bus or another approach. For example, FIG. 12 shows the connection via the bus.

The memory 1220 as a computer readable storage medium can store a software program, a computer executable program and a module, such as the program instructions/modules corresponding to the method for identifying a lane line of the present disclosure (e.g. the inverse projection transformation module 101, the region identification module 102, the probability calculation module 103, and the model reconstruction module 104 in the apparatus for identifying a lane line as shown in FIG. 10). The processor 1210 executes various functions of the device and processes data by running the software program, computer executable program and module stored in the memory 1220, so as to implement the method for identifying a lane line of the above embodiment.

The memory 1220 may include a program storing region and a data storing region. The program storing region may store an operating system and an application required for at least one function. The data storing region may store data established for terminals' use, and the like. Moreover, the memory 1220 may include a high speed random access memory, and may include a non-volatile memory, such as at least one disk storage device, flash memory device, and other non-volatile solid memory device. In some embodiments, the memory 1220 may further include a memory disposed apart from the processor 1210, which may be connected to a terminal device via a network. The network includes by not limited to the Internet, intranet, LAN, mobile communication network, and the combination thereof.

The input apparatus 1230 may be configured to receive an input number or character message and generate a key signal input related to the terminal user settings and the function control. The output apparatus 1240 may include a display device, such as a display screen.

The one or more modules are stored in the memory 1220, and when executed by the one or more processors 1210, cause the one or more processors 1210 to perform operations. The operations include: identifying an image region of a lane line in an image based on two-dimensional filtering; inputting the image, in which the image region of the lane line has been identified, into a convolutional neural network-based lane line identification model to obtain an output probability of the model; and performing model reconstruction based on the output probability to identify the lane line in the input image.

Further, before the identifying an image region of a lane line in an image based on two-dimensional filtering, the method further comprises: performing an inverse projection transformation on an original image to adjust an optical axis direction of the original image to be perpendicular to a ground surface.

Further, the performing model reconstruction based on the output probability to identify the lane line in the input image comprises: performing model reconstruction according to an equation below:

$$\operatorname*{argmax}_{k} \sum_{i \in L_k} \left\| w_i^{length} + w_i^{score} + \left( \sum_{j \in L_k \& j \neq i} w_{ij}^{angle} + w_{ij}^{dist} \right) \right\|$$

wherein $w_i^{length}$ and $w_i^{score}$ respectively represent a length of an $i^{th}$ lane line and a probability that the $i^{th}$ lane line is a real lane line, and $w_{ij}^{angle}, w_{ij}^{dist}$ respectively represent constraint relationships of angle similarity and distance between the $i^{th}$ lane line and a $j^{th}$ lane line.

With the above description of the embodiments, it can be known by the skilled person in the art that the present disclosure may be implemented by means of software and necessary and general hardware. Although the embodiments may be implemented by means of only hardware, it is optimal to implement the embodiments by means of the combination of software and hardware. Based on this concept, the technical solutions of the present disclosure or the part of the present disclosure over the prior art may be embodied in the form of a software product. The computer software product may be stored in a computer readable storage medium, such as a floppy disk, a read-only memory (ROM), a random access memory (RAM), a flash memory, a hard disk or an optical disk, and may include some instructions for causing a computer device (a personal computer, a server, a network device or the like) to implement the method of embodiments of the present disclosure.

It should be noted that the units and modules in the embodiments of the digital image conversion apparatus are partitioned according to function logics, but not limited thereto, as long as the corresponding functions can be achieved. In addition, the specific names of the functional units are merely used to distinguish from each other, but not limit the scope of the present disclosure.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for modeling a lane line identification, comprising:
   identifying an image region of a lane line in an image based on two-dimensional filtering;
   constructing model training data by using the identified image region; and
   training a convolutional neural network-based lane line identification model by using the model training data;
   wherein the method is performed by one or more processors;
   wherein before the identifying an image region of a lane line in an image based on two-dimensional filtering, the method further comprises:
      performing an inverse projection transformation on an original image to adjust an optical axis direction of the original image to be perpendicular to a ground surface;
   wherein the performing an inverse projection transformation on an original image to adjust an optical axis direction of the original image to be perpendicular to a ground surface comprises:
      performing the inverse projection transformation on the original image according to:

$$\begin{bmatrix} x_w \\ z_w \\ y_w \\ z_w \\ 1 \end{bmatrix} = s \begin{bmatrix} \cos\gamma & 0 & \sin\gamma \\ 0 & 1 & 0 \\ -\sin\gamma & 0 & \cos\gamma \end{bmatrix} \begin{bmatrix} \cos\beta & \sin\beta & 0 \\ -\sin\beta & \cos\beta & 0 \\ 0 & 0 & 1 \end{bmatrix}$$

$$\begin{bmatrix} 1 & 0 & 0 \\ 0 & \cos\alpha & \sin\alpha \\ 0 & -\sin\alpha & \cos\alpha \end{bmatrix} \begin{bmatrix} 1/f_u & 0 & -c_u/f_u \\ 0 & 1/f_v & -c_v/f_v \\ 0 & 0 & 1 \end{bmatrix} \begin{bmatrix} u \\ v \\ 1 \end{bmatrix}$$

wherein $\alpha$, $\beta$, and $\gamma$ are respectively a pitch angle, a yaw angle and a roll angle of a camera, $f_u$ and $f_v$ are respectively focal lengths of the camera in vertical and horizontal directions, $c_u$ and $c_v$ are respectively an abscissa and an ordinate of a coordinate point at an optical center of the camera, u and v respectively represent an abscissa and an ordinate of a coordinate point in a two-dimensional space of an image before transformation, $x_w$, $y_w$ and $z_w$ respectively represent three-dimensional coordinates of the coordinate point in a three-dimensional space after transformation, and s is a normalized parameter.

2. The method according to claim 1, wherein the identifying an image region of a lane line in an image based on two-dimensional filtering comprises:
   performing filtering on the image by using filter kernels having different width parameters and height parameters, and selecting an image having a most distinguished image contour as a filtering result image;
   binarizing the filtering result image to form a connected domain; and
   performing linear boundary fitting on the connected domain by using an improved ransac algorithm.

3. The method according to claim 2, wherein the constructing model training data by using the identified image region comprises:
   broadening the connected domain to form a region of interest on the image; and
   using the image comprising the region of interest as the model training data.

4. A method for identifying a lane line, comprising:
   identifying an image region of a lane line in an image based on two-dimensional filtering;
   inputting the image, in which the image region of the lane line has been identified, into a convolutional neural network-based lane line identification model to obtain an output probability of the model; and
   performing model reconstruction based on the output probability to identify the lane line in the input image;
   wherein the method is performed by one or more processors;
   wherein the performing model reconstruction based on the output probability to identify the lane line in the input image comprises:
      performing model reconstruction according to:

$$\arg\max_k \sum_{i \in L_k} \left\| w_i^{length} + w_i^{score} + \left( \sum_{j \in L_k \& j \neq i} w_{ij}^{angle} + w_{ij}^{dist} \right) \right\|$$

wherein $w_i^{length}$ and $w_i^{score}$ respectively represent a length of an $i^{th}$ lane line and a probability that the $i^{th}$ lane line is a real lane line, and $w_{ij}^{angle}, w_{ij}^{dist}$ respectively represent constraint relationships of angle similarity and distance between the $i^{th}$ lane line and a $j^{th}$ lane line.

5. The method according to claim 4, wherein before the identifying an image region of a lane line in an image based on two-dimensional filtering, the method further comprises:
performing an inverse projection transformation on an original image to adjust an optical axis direction of the original image to be perpendicular to a ground surface.

6. A non-transitory computer storage medium storing computer executable instructions, the computer executable instructions, when executed by a processor of a computer, causing the processor to execute a method for modeling a lane line identification, wherein the method comprises:
identifying an image region of a lane line in an image based on two-dimensional filtering;
constructing model training data by using the identified image region; and
training a convolutional neural network-based lane line identification model by using the model training data;
wherein before the identifying an image region of a lane line in an image based on two-dimensional filtering, the method further comprises:
performing an inverse projection transformation on an original image to adjust an optical axis direction of the original image to be perpendicular to a ground surface;
wherein the performing an inverse projection transformation on an original image to adjust an optical axis direction of the original image to be perpendicular to a ground surface comprises:
performing the inverse projection transformation on the original image according to:

$$\begin{bmatrix} \frac{x_w}{z_w} \\ \frac{y_w}{z_w} \\ 1 \end{bmatrix} = s \begin{bmatrix} \cos\gamma & 0 & \sin\gamma \\ 0 & 1 & 0 \\ -\sin\gamma & 0 & \cos\gamma \end{bmatrix} \begin{bmatrix} \cos\beta & \sin\beta & 0 \\ -\sin\beta & \cos\beta & 0 \\ 0 & 0 & 1 \end{bmatrix}$$

$$\begin{bmatrix} 1 & 0 & 0 \\ 0 & \cos\alpha & \sin\alpha \\ 0 & -\sin\alpha & \cos\alpha \end{bmatrix} \begin{bmatrix} 1/f_u & 0 & -c_u/f_u \\ 0 & 1/f_v & -c_v/f_v \\ 0 & 0 & 1 \end{bmatrix} \begin{bmatrix} u \\ v \\ 1 \end{bmatrix}$$

wherein $\alpha$, $\beta$, and $\gamma$ are respectively a pitch angle, a yaw angle and a roll angle of a camera, $f_u$ and $f_v$ are respectively focal lengths of the camera in vertical and horizontal directions, $c_u$ and $c_v$ are respectively an abscissa and an ordinate of a coordinate point at an optical center of the camera, u and v respectively represent an abscissa and an ordinate of a coordinate point in a two-dimensional space of an image before transformation, $x_w$, $y_w$ and $z_w$ respectively represent three-dimensional coordinates of the coordinate point in a three-dimensional space after transformation, and s is a normalized parameter.

7. A device, comprising:
one or more processors; and
a memory;
wherein one or more programs are stored in the memory, and when executed by the one or more processors, the one or more programs cause the one or more processors to perform operations comprising:
identifying an image region of a lane line in an image based on two-dimensional filtering;
constructing model training data by using the identified image region; and
training a convolutional neural network-based lane line identification model by using the model training data;
wherein before the identifying an image region of a lane line in an image based on two-dimensional filtering, the operations further comprise:
performing an inverse projection transformation on an original image to adjust an optical axis direction of the original image to be perpendicular to a ground surface;
wherein the performing an inverse projection transformation on an original image to adjust an optical axis direction of the original image to be perpendicular to a ground surface comprises:
performing the inverse projection transformation on the original image according to:

$$\begin{bmatrix} \frac{x_w}{z_w} \\ \frac{y_w}{z_w} \\ 1 \end{bmatrix} = s \begin{bmatrix} \cos\gamma & 0 & \sin\gamma \\ 0 & 1 & 0 \\ -\sin\gamma & 0 & \cos\gamma \end{bmatrix} \begin{bmatrix} \cos\beta & \sin\beta & 0 \\ -\sin\beta & \cos\beta & 0 \\ 0 & 0 & 1 \end{bmatrix}$$

$$\begin{bmatrix} 1 & 0 & 0 \\ 0 & \cos\alpha & \sin\alpha \\ 0 & -\sin\alpha & \cos\alpha \end{bmatrix} \begin{bmatrix} 1/f_u & 0 & -c_u/f_u \\ 0 & 1/f_v & -c_v/f_v \\ 0 & 0 & 1 \end{bmatrix} \begin{bmatrix} u \\ v \\ 1 \end{bmatrix}$$

wherein $\alpha$, $\beta$, and $\gamma$ are respectively a pitch angle, a yaw angle and a roll angle of a camera, $f_u$ and $f_v$ are respectively focal lengths of the camera in vertical and horizontal directions, $c_u$ and $c_v$ are respectively an abscissa and an ordinate of a coordinate point at an optical center of the camera, u and v respectively represent an abscissa and an ordinate of a coordinate point in a two-dimensional space of an image before transformation, $x_w$, $y_w$ and $z_w$ respectively represent three-dimensional coordinates of the coordinate point in a three-dimensional space after transformation, and s is a normalized parameter.

8. A non-transitory computer storage medium storing computer executable instructions, the computer executable instructions, when executed by a processor of a computer, causing the processor to execute a method for identifying a lane line, wherein the method comprises:
identifying an image region of a lane line in an image based on two-dimensional filtering;
inputting the image, in which the image region of the lane line has been identified, into a convolutional neural network-based lane line identification model to obtain an output probability of the model; and
performing model reconstruction based on the output probability to identify the lane line in the input image;
wherein the performing model reconstruction based on the output probability to identify the lane line in the input image comprises:
performing the model reconstruction according to:

$$\operatorname*{argmax}_{k} \sum_{i \in L_k} \left\| w_i^{length} + w_i^{score} + \left( \sum_{j \in L_k \& j \neq i} w_{ij}^{angle} + w_{ij}^{dist} \right) \right\|$$

wherein $w_i^{length}$ and $w_i^{score}$ respectively represent a length of an $i^{th}$ lane line and a probability that the $i^{th}$ lane line is a real lane line, and $w_{ij}^{angle}$, $w_{ij}^{dist}$ respectively represent constraint relationships of angle similarity and distance between the $i^{th}$ lane line and a $j^{th}$ lane line.

9. A device, comprising:
one or more processors; and
a memory;
wherein one or more programs are stored in the memory, and when executed by the one or more processors, the one or more programs cause the one or more processors to perform operations comprising:
identifying an image region of a lane line in an image based on two-dimensional filtering;
inputting the image, in which the image region of the lane line has been identified, into a convolutional neural network-based lane line identification model to obtain an output probability of the model; and
performing model reconstruction based on the output probability to identify the lane line in the input image;
wherein the performing model reconstruction based on the output probability to identify the lane line in the input image comprises:
performing the model reconstruction according to:

$$\underset{k}{\operatorname{argmax}} \sum_{i \in L_k} \left\| w_i^{length} + w_i^{score} + \left( \sum_{j \in L_k \& j \neq i} w_{ij}^{angle} + w_{ij}^{dist} \right) \right\|$$

wherein $w_i^{length}$ and $w_i^{score}$ respectively represent a length of an $i^{th}$ lane line and a probability that the $i^{th}$ lane line is a real lane line, and $w_{ij}^{angle}, w_{ij}^{dist}$ respectively represent constraint relationships of angle similarity and distance between the $i^{th}$ lane line and a $j^{th}$ lane line.

10. The device according to claim 7, wherein the identifying an image region of a lane line in an image based on two-dimensional filtering comprises:
performing filtering on the image by using filter kernels having different width parameters and height parameters, and selecting an image having a most distinguished image contour as a filtering result image;
binarizing the filtering result image to form a connected domain; and
performing linear boundary fitting on the connected domain by using an improved ransac algorithm.

11. The device according to claim 10, wherein the constructing model training data by using the identified image region comprises:
broadening the connected domain to form a region of interest on the image; and
using the image comprising the region of interest as the model training data.

12. The device according to claim 9, wherein before the identifying an image region of a lane line in an image based on two-dimensional filtering, the operations further comprises:
performing an inverse projection transformation on an original image to adjust an optical axis direction of the original image to be perpendicular to a ground surface.

* * * * *